United States Patent [19]

Ketcham

[11] 4,427,616

[45] Jan. 24, 1984

[54] APPARATUS AND PROCESS OF CONVOLUTING THERMOPLASTIC TUBING WITHOUT THE USE OF WIRES

[75] Inventor: Lyman Ketcham, Long Valley, N.J.

[73] Assignee: Simmonds Precision Products Inc., Tarrytown, N.Y.

[21] Appl. No.: 321,974

[22] Filed: Nov. 16, 1981

[51] Int. Cl.³ .............................................. B29C 17/02
[52] U.S. Cl. .................................. 264/286; 425/336; 425/369
[58] Field of Search ................. 425/336, 369; 264/286

[56] References Cited

U.S. PATENT DOCUMENTS

| | | | |
|---|---|---|---|
| 2,766,806 | 10/1956 | Rothermel et al. | 264/286 |
| 3,021,245 | 2/1962 | Roberts et al. | 156/144 |
| 3,635,255 | 1/1972 | Kraner | 138/122 |
| 4,017,244 | 3/1977 | Vellani | 425/364 |
| 4,365,948 | 12/1982 | Chaplain | 425/336 |

*Primary Examiner*—James H. Derrington
*Attorney, Agent, or Firm*—Edwin E. Greigg

[57] ABSTRACT

Apparatus and method for convoluting TEFLON tubing without use of wires, rotating a mandrel which has a diameter smaller than that of the TEFLON, threading the mandrel at the other end, rotating and assemblying over a threaded portion a means in an opposite direction thereof, and supporting at each end means allowing the mandrel to pass axially therethrough and having a series of worm gears rotatingly mounted in diametrical opposite pairs.

10 Claims, 4 Drawing Figures

APPARATUS AND PROCESS OF CONVOLUTING THERMOPLASTIC TUBING WITHOUT THE USE OF WIRES

BACKGROUND OF THE INVENTION

The invention relates to apparatus and process of forming convolutions in a TEFLON or thermoplastic tubing by use of a helical mandrel and a system of gears, each gear thereof having surface areas that are complemental to the helix so that a tube which is passed through the device is emitted or extruded as a corrugated member.

An example of the earlier concept of winding a wire on a threaded mandrel for deforming a tubular member is disclosed by U.S. Pat. No. 3,635,255 to Kramer. The patent to Roberts et al, U.S. Pat. No. 3,021,245 also discloses a mandrel that is shaped to resemble a helix. In these devices, a tubular member was placed over the mandrel and a wire was wound about the mandrel, deforming the tubular member in a convoluted and corrugated manner. The wire was removed from the outside of the tubular member and scraped. The convoluted/corrugated tubular member was then removed from the mandrel.

SUMMARY AND OBJECTS OF THE INVENTION

The invention relates to apparatus and process of convoluting TEFLON or thermoplastic tubing without the use of wires, and in which a coupling on the end of steel tube is removed, a length of TEFLON tubing to be convoluted is slid over the steel tube until it engages a threaded portion (mandrel) of the steel tube and a first pair of a series of worm gears. The coupling is replaced and then a rotating drive is imparted to the steel tube in one direction and a second rotating drive is imparted to a series of worm gears, which engage the exterior of the TEFLON tubing, in a second direction. Because the steel tube engaging the TEFLON tubing interior and the gears engaging the tubing exterior rotate in opposite directions of approximately equal speeds, the rotational forces are cancelled at the TEFLON tubing, which, therefore, does not rotate. An engagement of the rotationally stationary tubing with the threaded portion will create a screw effect which causes the TEFLON (or thermoplastic) tubing to be self-propelled along the threaded portion of the steel tube. The steel tube threaded portion and the series of worm gears, which are driven by the threaded portion, are positioned in an oven where the tubing is heated until pliable. As the threaded portion turns, the tubing is moved laterally into the oven and through the series of worm gears. These worm gears deform the tubing to follow the shape of the threaded portion of the steel tube. After cooling, the TEFLON tubing, now hardened and convoluted, is removed from the apparatus.

While this is the process of convoluting the TEFLON tubing, it is noted the TEFLON or thermoplastic tubing may be allowed to turn slightly depending on the desired speed through the oven process.

An object and advantage of the invention is to provide a method and apparatus for improvements in deforming plastic or TEFLON or thermoplastic tubing by use and means of gear elements disposed in an insulated oven.

It is another and further object and advantage of the invention to provide unique and improved methods and apparatus in convoluting TEFLON or thermoplastic tubing.

A further and additional object and advantage of the invention is to provide a method of and apparatus for forming convolutions in a TEFLON or thermoplastic tubing by providing for the use of a helical mandrel and a system of gear elements, each of the gear elements having surface areas that are complemental to the helix or helical mandrel so that a plastic tube passed through the device is exited or emitted as a corrugated member.

A further object of the invention is to provide apparatus uniquely and singly useful for making convoluted tubing made or consisting of TEFLON or thermoplastic materials, being distinct from machines and processes for making and extruding and corrugating polyvinylchloride type material.

The objects and advantages of the invention are therefore a new and useful plastic convoluting machine and process.

The above and other objects and advantages of the invention will become apparent upon full consideration of the following detailed description and accompanying drawings.

BRIEF DESCRIPTION OF THE DRAWINGS

FIG. 4 illustrates the manner in which a worm gear engages the mandrel to convolute the tubing.

DETAILED DESCRIPTION OF THE PREFERRED EMBODIMENT

Figure 1:
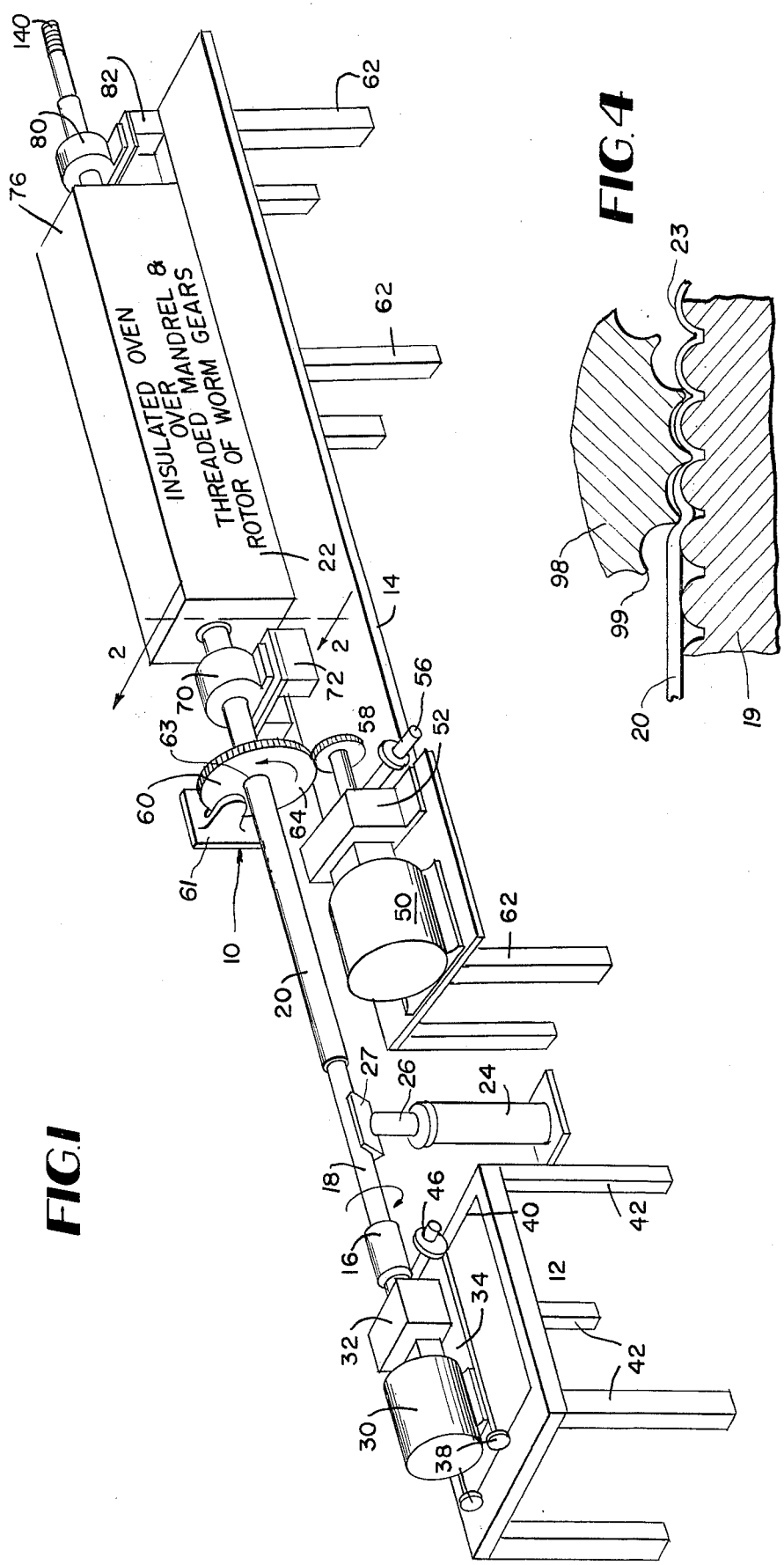
FIG. 1 is a generally perspective view of a convoluting TEFLON or thermoplastic tubing machine in accordance with a preferred embodiment and best mode of the invention.

Referring now to the drawings, there is shown in FIG. 1 a convoluting TEFLON or thermoplastic tubing machine 10 having a set of work tables or work platforms 12, 14 linked together by an arrangement of a coupling 16, a stainless steel tube 18 being welded to a threaded mandrel 19 (see FIG. 2) and an extruded TEFLON or thermoplastic tube member or tubing 20 shown extending to and within an insulated oven 22. A tube support 24 is shown to provide adjustable support to the stainless steel tube 18 and is shown as adjustable as shaft 26 axially slides, and is then secured in place within the tube support 24. Bracket 27 is provided with a bearing-like assembly (not shown) which provides minimal friction to rotating steel tube 18.

The coupling 16, steel tube 18 and tubing 20 are in axial alignment.

On the work platform 12 is a variable speed drive 30 comprising an electric motor that is coupled through an electric controller 32 and shown mounted on a common frame 34 that is supported by the top of the work platform 12. The work platform 12 has support legs 42. Variable switch 46 provides manual control of the variable drive motor 30 through controller 32. This in turn controls the speed of rotation of steel tube 18 via coupling 16.

Figure 2:
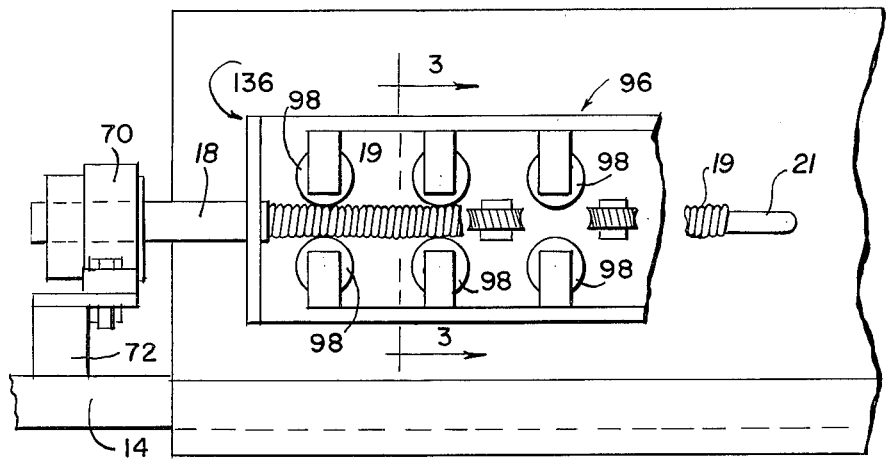
FIG. 2 is a front elevational view taken along line 2—2 of FIG. 1 on enlarged scale and showing within an insulated oven a threaded mandrel and rotor of mating worm gears in accordance with FIG. 1.

The work stand 14 supports a further variable speed drive 50 comprising an electric motor that may be similar in characteristics to the variable speed drive 30 described above, and the drive 50 also is provided with an electrical controller 52 and an adjustment element of variable switch 56 to provide speed adjustment to the controller 52 in a conventional manner. The output of the assembly of drive 50 and controller 52 is a drive gear element 58 coupled in driving relation to a gear member 60 mounted in secured relation to the rotor support tube 61. Support tube 61 has a hole 63 which is large enough to provide clearance for tubing work piece 20 which passes through hole 63. The gear member 60 driven by gear 58 rotates in a direction shown by arrow 64, opposite to that of steel tube 18. Support tube 61 passes through rotor support mounting 70 and enters the insulated oven 22, in which the support tube 61 is attached to end support plate 136 (FIG. 2). Rotation of the support tube 61 causes the rotor assembly 96 to rotate as discussed later. When gear member 60, is actuated, tubing work piece 20 is held stationary. This is due to the fact that there are approximately equal frictional forces between the mandrel 19 and tube 20 and between gears 98 and tube 20. The rotation of steel tube 18 opposite to the rotation of gear member 60 is at approximately the same speed which creates a cancelling effect at tube 20. Therefore, tube 20 does not rotate. As can be seen from FIG. 1, gear member 60 is prevented from moving laterally with tube 20 by a radial and thrust bearing 70.

The coupling 16 provides that the TEFLON or thermoplastic extruded tubing work piece 20 follows the driven steel tube 18, since the coupling 16 may be of any coupling structure such as a shaft key and mating shaft recess arrangement (not shown).

The work platform 14 has similar support legs 62.

Rotor support mountings 70, 80 having a base 72, 82 of conventional construction provides support for tubing work piece 20 and shaft 18 that extends into the housing 76 of the insulated oven 22. When tube 20 is not on steel tube 18, all support to steel tube 18 is provided by coupling 16, support 24, and the worm gears 98 in oven 76, which are discussed later.

Figure 3:
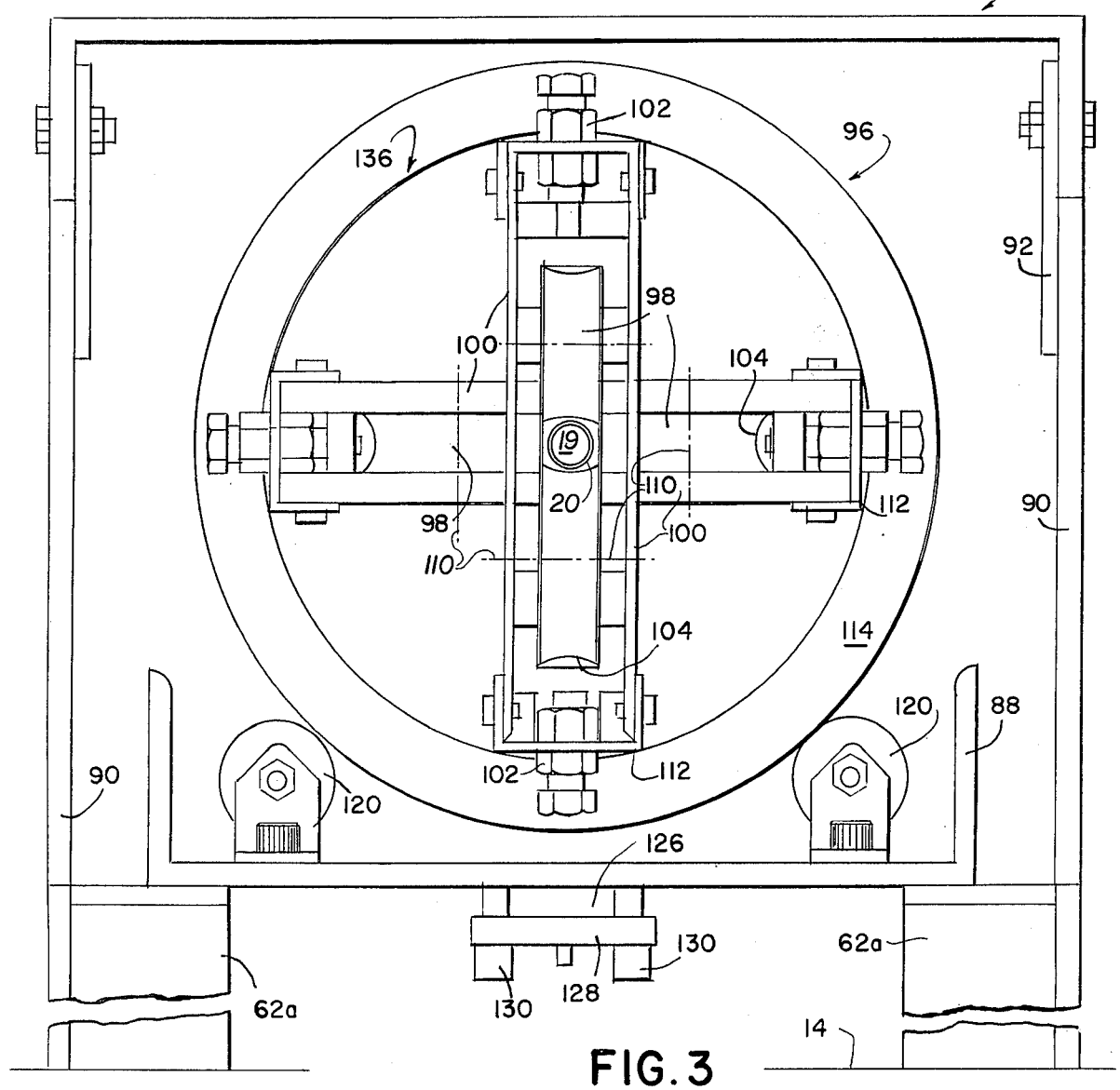
FIG. 3 shows a side elevational view taken along line 3—3 of FIG. 2 on a further enlarged scale.

FIGS. 2 and 3 show the arrangement within the oven 22 supported from the work platform 14 and on which there is shown an aluminum or other metal-formed channel 88 extending for nearly the entire inner longitudinal length of the oven 76.

The oven 22 is provided with one or several layers 90, 92 of insulation sheet material for circumferentially encompassing the work length area along the upper surface and the entire length of the metal channel 88.

The steel tube 18 is welded to a threaded cylindrical mandrel 19 (FIG. 2), and is designed to have a diameter slightly smaller than the inside diameter of the tubing 20 that is to be convoluted and having a length greater than the length of the tubing 20. A start end to the mandrel is provided at the end of the steel tube 18 via the removable coupling 16 as described above. A portion of the other end of the mandrel is threaded to the shape and pitch of the convolution desired for the tubing. The length of the convoluted portion of the tubing 20 is determined by a linear speed of the tubing through the oven and the time required to heat-set the convoluted tubing. The extreme or down-stream end of the mandrel may have a cylindrical or smooth rounded portion 21 which is slightly smaller in diameter than the inside of the convoluted tubing. This rounded end allows a relatively easy removal of the tubular member from the mandrel after convoluting.

Assembled adjacently over the threaded portion of the mandrel and extending partially over said extreme end of the mandrel is a rotor assembly 96 shown in FIGS. 2 and 3. The rotor assembly 96 is supported at each end by bearings 70 and 80.

The rotor assembly 96 contains a series of freely rotating worm gears 98 mounted in diametrically opposite pairs with alternate pairs 98 mounted in right angled relation to each other. These worm gears 98 are mounted to rotate freely on yokes 100 which permit adjustment by adjustment elements 102 for various sizes of mandrels and TEFLON tubes. These worm gears have a concave threaded face 104 machined to mate in threaded relation with the thread of the mandrel with allowances being made for wall thickness of the tubing 20 being convoluted by the engagement of the worm gears 98 and the threads of the mandrel. The axis 110 of the worm gears 98 are at right angles to the axis of the mandrel and tubing 20, and the worm gears are rotated as the helical mandrel rotates. Though the preferred embodiment of FIGS. 2 and 3 show the worm gears 98 at right angles to one another, the worm gears 98 may be at other than right angles to insure that the entire circumference of tube 20 is convoluted.

The adjustment elements 102 are securably mounted on a main aligning channel 112 affixed within an outer support ring 114 which in turn is supported from a support ring roller assembly 120 mounted from the metal channel 88. Manipulation of the adjustment elements 102 will cause the work gears to move radially to or from the mandrel.

Centrally of the housing 76 and beneath the metal channel 88 is heater element 126 secured in position by heater mounting strap 128 and screws 130,130. The rotor assembly 96 has an end support plate 136 with support tube 61 affixed, through which the mandrel and tubular member pass, at each end shown in FIGS. 2 and 3. Thus, as gear member 60 turns support tube 61, end support plate 136 will cause the rotor assembly 96 to rotate opposite to the rotation of steel tube 18.

The threaded portions of the mandrel 19 within the tubing 20 of FIG. 1 and corresponding or mating portions of the worm gears 98 of the rotor assembly 96 of FIG. 2 are mounted enclosed within an insulated oven housing 76 of FIG. 1 and in which the interior of the oven housing is maintained relatively fixed at selected appropriate temperatures for heat setting the convoluted TEFLON or thermoplastic tubing by conventional or well-known means before the convoluted tubing 140 exits from the housing.

FIG. 4 shows worm gear 98 engaging mandrel 19. Between the worm gear 98 and mandrel 19 is tubing 20. At the left side of FIG. 4, tubing 20 is shown in a partial cut-away view before convoluting. As the teeth 99 of worm gear 98 engage mandrel 19, the heated tubing 20 is manipulated between the worm gears 98 and the mandrel 19. The heated tube 20 is pliable and thus permits the driving of worm gears 98 by mandrel 19 through the surface of the tube 20. In this manner the tube 20 is shaped in the form of mandrel 19 and is convoluted as illustrated at 23.

The extreme end of the mandrel and said corresponding length of worm gear pairs 98 may extend beyond the oven portion to allow for desired cooling of the convoluted tubing while it is processed and held in shape by the worm gears and rotor assembly 96 (FIG. 1).

The invention is utilized as follows. By manipulating coupling 16, steel tube 18 is disconnected from variable drive 30. A TEFLON or thermoplastic tubing 20 is slipped over the end of steel tube 18 in the direction of insulated oven 76. Tubing 20 is moved forward, through hole 63 in rotor support tube 61 and support 70 until one end enters the insulated oven 76. Steel tube 18 is coupled to coupling 16 and variable drive 30 is actuated causing the steel tube, and at this point tubing 20, to rotate in a first direction. Variable drive 50 is actuated to drive gear member 60 in a second direction opposite of the rotation of the steel tube 18. Since the rotor assembly 96 is rotating and gear members 98 are mounted to engage tubing 20, tubing 20 will remain approximately stationary relative to the rotation of gear member 60 and steel tube 18.

After the end to tubing 20 has entered the insulated oven 76, the tubing end will engage the first coils of the mandrel 19, which is rotating and the first worm gears 98 which are driven in response to the rotating mandrel 19 and the rotating rotor assembly. The engagement of the tubing 20 with the mandrel 19 and gears 98 will cause a "threading" of tubing 20 along the helical structure of the mandrel 19. Thus, the fact that the tubing 20 is stationary with respect to the rotation of mandrel 19 will cause tubing 20 to move longitudinally along mandrel 19 and through the insulated oven 76.

Tubing 20 will be convoluted by the mandrel 19 and worm gears 98 as discussed with respect to FIG. 4 and will eventually be driven out of oven 76. After the tube 20, now convoluted, has cooled and thus hardened, it may be removed from mandrel 19 over the rounded end 21.

It is seen that the method and apparatus of the invention obtain an improved convoluted tubing without the conventional use of wire equipment.

Additional embodiments of the invention in this specification will occur to others, and therefore it is intended that the scope of the invention be limited only by the appended claims and not by the embodiments described herein above. Accordingly, reference should be made to the following claims in determining the full scope of the invention.

What is claimed and desired to be secured by Letters Patent of the United States is:

1. Apparatus for convoluting heated tubing without the use of wires comprising:
   an oven in which a mandrel means and associated worm gears are positioned;
   said mandrel means having a diameter slightly smaller than the inside diameter of tubing to be convoluted and having a length greater than the length of the tubing;
   said mandrel means having a start end provided with a removable coupling and a means providing rotation thereof;
   said mandrel means being threaded at the other end to shape and pitch of a given convolution;
   said mandrel means having at an extreme end a generally smooth round portion being slightly smaller in diameter than an inside dimension of the tubing;
   means assembled over the threaded portion and extending partially over the extreme end of the mandrel means for rotation thereof in an opposite direction from the mandrel means;
   and support means for the means assembled over the threaded portion, positioned at the start end and extreme end allowing the mandrel means to pass axially therethrough;
   said assembled means having a series of freely rotating worm gears mounted in diametrically opposite pairs, wherein alternate pairs are disposed at right angles to each other;
   said worm gears being mounted on an adjustable yoke means which has a device for allowing adjustment for various sized mandrel means and tubing; and
   wherein said worm gears and said mandrel means engage the tubing to laterally move the tubing along said mandrel, and to convolute the tubing according to a lateral speed of the tubing.

2. The invention of claim 1 wherein said rotation means is a variable speed drive.

3. The invention of claim 1 wherein said support means is comprised of radial and thrust bearings.

4. The invention of claim 1 wherein said worm gears have a concave face and being machined to mate the threaded mandrel means and having allowance made for a wall thickness of the tubing being convoluted.

5. The invention of claim 1 wherein an axis of said worm gears are at right angles to the axis of the mandrel means and being rotated as the mandrel means rotates.

6. The invention of claim 1 wherein said threaded portion of the mandrel means and a corresponding portion of the assembled means are enclosed in an insulated oven having temperature thereof maintained for heat-setting the convoluted tubing.

7. The invention of claim 1 wherein said round extreme end of the mandrel means and a corresponding length of said series of worm gears extend beyond the oven to allow cooling of the convoluted tubing while held in shape by said series of worm gears.

8. A method of placing a thermoplastic tubing on a mandrel for heating and convoluting said tubing without the use of wires comprising the steps of:
   rotating a mandrel having a diameter slightly smaller than the inside diameter of tubing to be convoluted and having a length greater than the length of the tubing, said mandrel means having a start end provided with a removable coupling,
   threading said mandrel means at the other end to shape and pitch of a given convolution and the length of the threaded portion being determined by linear speed of the tubing and by the time required to heat-set the convoluted tubing,
   said mandrel means having at an extreme end a generally smooth round portion being slightly smaller in diameter than an inside dimension of the tubing,
   rotating and assembling over the threaded portion and extending partially over the extreme end of the mandrel means thereof in an opposite direction from the mandrel means, and
   supporting at the start end and extreme end with a support means which end allows the mandrel means to pass axially there through and having a series of freely rotating worm gears mounted in diametrically opposite pairs, alternate pairs disposed at right angles to each other, said worm gears being mounted on yoke means and
   adjusting for various sized mandrel means and tubes.

9. The invention of claim 1 wherein the tubing is a thermoplastic.

10. The invention of claim 8 wherein the tubing is a thermoplastic.

* * * * *